June 23, 1964 W. C. BRASS 3,137,877
CLINICAL THERMOMETER CLEANING DEVICE
Filed Dec. 6, 1962 7 Sheets-Sheet 1

INVENTOR
WILLIAM C. BRASS
ATTORNEY

June 23, 1964 W. C. BRASS 3,137,877
CLINICAL THERMOMETER CLEANING DEVICE
Filed Dec. 6, 1962 7 Sheets-Sheet 2

INVENTOR
WILLIAM C. BRASS
BY Herbert A. McInture
ATTORNEY

June 23, 1964 W. C. BRASS 3,137,877
CLINICAL THERMOMETER CLEANING DEVICE
Filed Dec. 6, 1962 7 Sheets-Sheet 5

INVENTOR
WILLIAM C. BRASS
BY Herbert A. Weintraub
ATTORNEY

INVENTOR
WILLIAM C. BRASS
BY Herbert A. McIntyre
ATTORNEY

United States Patent Office 3,137,877
Patented June 23, 1964

3,137,877
CLINICAL THERMOMETER CLEANING DEVICE
William C. Brass, 354 N. Audubon St., Indianapolis, Ind.
Filed Dec. 6, 1962, Ser. No. 242,658
12 Claims. (Cl. 15—21)

This invention relates to a device for cleaning and sterilizing clinical thermometers such as are employed in hospitals in large numbers. Normally a nurse or an attendant will be charged with the taking of the temperature of a number of patients, and will go from one patient to the other taking a supposedly sterilized thermometer to each patient and then recording the temperature indicated. In so doing, in the larger hospitals, there will be thousands of these thermometers used each day and it is a laborious task to clean them and sterilize them and hold them in storage to be out of contact with the mercury well end of each thermometer at least until the thermometer is to be reused. These thermometers will be subjected to various types of bacterial and virus bodies, and unless thoroughly removed, the thermometers can carry such bodies from one patient to another. Also the thermometer will become contaminated by other materials such as lipstick, all of which must of course be removed.

Heretofore, attendants have been employed to take a number of these thermometers, washing them individually, and then dipping them into some sort of a supposedly sterilizing solution, cleaning the solution off by such a medium as an alcohol, and then standing the thermometers in some sort of a vessel.

The device herein described as embodying the invention eliminates the hand labor during the cleaning and sterilizing operations.

The inventive device embodies a frame holding a plurality of thermometers; receiving the holder initially between upper ends of moving brushes; allowing the holder with its carried thermometers to work down between opposing brushes; the frame being lifted and dropped vertically so that all surfaces of the thermometers may be free to be scrubbed by the brushes; the brushes being carried in a vessel containing a cleaning fluid.

Then upon the completion of the cleaning of the thermometers, the frames may be lifted from that vessel, without having hands coming into contact with the thermometers, and the frames can then be carried to and dropped into another vessel to allow the cleaning solution to drip away. Then the vessel containing the "dripped" frames and thermometers is dipped into another vessel containing a sterilizing fluid or solution; and then rinsing the thermometers while still held in the frame and allowing that sterilizing material to be drained from the thermometers, and the thermometers rinsed in alcohol and allowed to remain in the otherwise emptied vessel with a cover thereover so as to maintain the thermometers in an atmosphere removed from the surrounding external atmosphere. When the thermometers are required for use, a frame at a time may be removed from the vessel and placed in a suitable carrying member to be taken directly to the rooms or wards in the hospital. For use in doctors' offices, a closed carrying or storage receptacle may be employed.

All of these various steps and members of the cleaning device will be described in reference to the accompanying drawings, and in the description, other objects and advantages of the invention will become apparent to those versed in the art.

A rectangular box 22 serves as a receptacle and may be made out of any suitable material such as metal, or a plastic, practically inert to alkalis and acids, transparent, translucent, or opaque as may be desired. This box 22 has a bottom floor 24 spaced a slight distance above the lower ends of the box walls, FIG. 5. The box is made to be liquid tight. On opposite side walls of the box, there is a ledge 25 extending a slight distance inwardly from the wall. These opposite walls of the box 22 are designated by the numerals 26 and 27. The box 22 is primarily rectangular in shape with the ends 28 and 29 being shorter than the sides 26 and 27.

Adjacent one end of the box 22, herein shown as the end 28, there is mounted a small motor 30 preferably of the built-in gear reduction type. In the present showing, this motor 30 is mounted on the end 28. There is a cross shaft 31 mounted above the motor 30 in any suitable manner, herein shown as being carried by a bracket 32 also mounted on the end 28. This shaft 31 has fixed thereto a pulley 33 around which a belt 34 is trained to extend downwardly and around a pulley 35 fixed on the drive shaft of the motor 30. On each end of the shaft 31 there is fixed an eccentric wheel 36 and 37 respectively. A pair of rods 38 and 39 are interconnected by circular end portions in the nature of eccentric straps 40 and 41 respectively. The throws of the wheels are 180 degrees apart.

Liquid may be drained from the box through a tube 23 leading from the floor 24 to a petcock 42.

Figure 7:
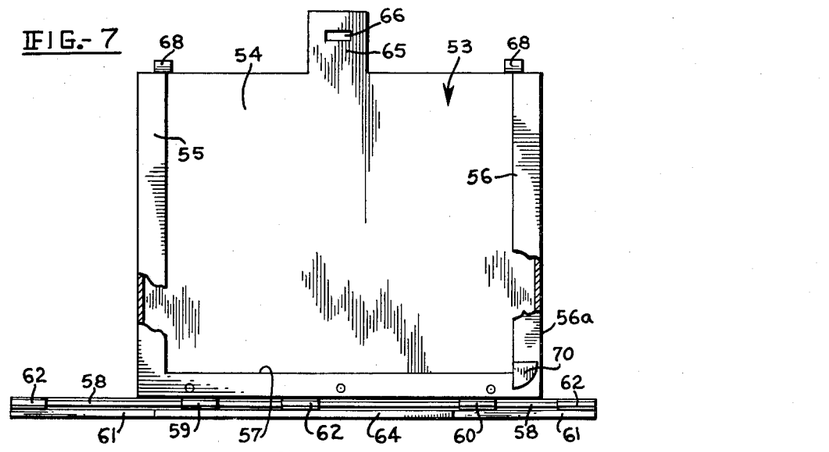
FIG. 7 is a view in front elevation and partial section of a brush unit holder.
Figures 8, 9, 10, 11:
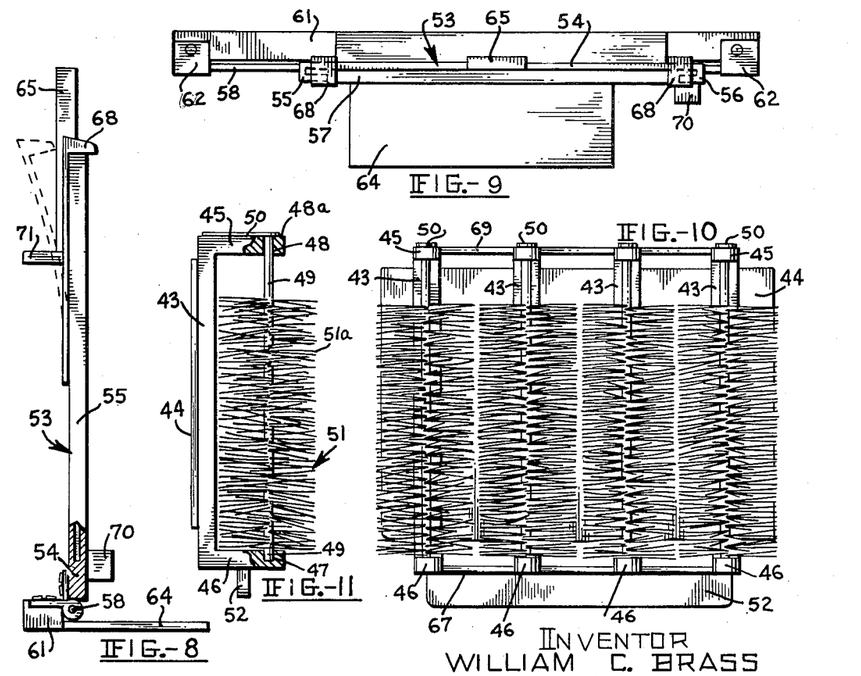
FIG. 8 is a view in end elevation and partial section of the holder.
FIG. 9 is a view in top plan of the holder.
FIG. 10 is a view in front elevation of a brush unit on a reduced scale.
FIG. 11 is a view in end elevation of the brush unit on a reduced scale.
Figure 12:
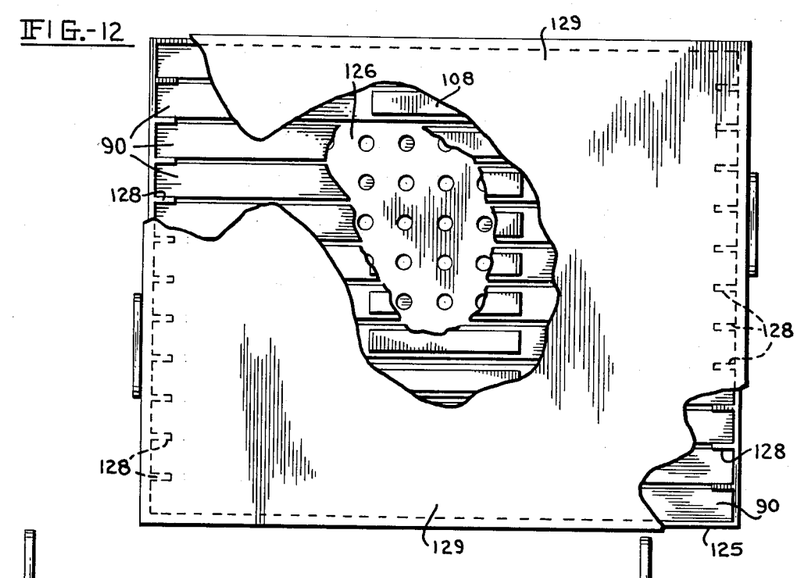
FIG. 12 is a view in top plan of a thermometer sterilizer and holding receptacle with fragments of the cover and of thermometer frames removed.

Reference is now made to the structure illustrated in FIGS. 7-11. In FIG. 10 and FIG. 11, there is illustrated a brush unit. A brush-holding frame in the nature of a plurality of vertically extending C-brackets, herein shown as four in number, and each designated by the numeral 43 are aligned vertically in spaced apart relation on a back plate 44. Each bracket 43 has top and bottom arms 45 and 46 horizontally positioned, at top and bottom ends respectively of the bracket 43. The lower arm 46 has a socket 47 entering from its top side. The upper arm 45 has a hole 48 extending entirely therethrough. The hole 48 is vertically aligned with the socket 47. In each of these sockets 47 there is positioned revolubly the lower end of a brush shaft 49, the upper end of the shaft 49 entering the hole 48, this upper end terminating substantially at the top side 48a of the arm 45. The shaft 49 is thus rotatably carried by these arms 45 and 46. To disengage the shaft 49 from those arms, the shaft 49 is axially lifted upwardly through the hole 48 a distance sufficiently to remove its lower end from the socket 47, whereupon the brush may be dropped downwardly with the shaft 49 to one side of the arm 46 a distance sufficient to remove its top end from the hole 48. In order to prevent the shaft 49 from moving axially upwardly, a clip 50 in the nature of a spring is carried by each arm 45 to extend across the top side of the hole 48, and when the shaft 49 is grasped, and lifted, the spring 50 yields sufficiently to permit the removal of the lower end of the shaft from the socket 47.

The shaft 49 in each instance carries bristles of a brush generally designated by the numeral 51. These bristles 51a are made out of elastic, yielding material, preferably a plastic so that the bristle ends will not scratch the thermometers when brought thereagainst. The bristles 51a are arranged to have their outer ends terminate in a generally cylindrical arrangement, the inner ends of the bristles being fixed to the shaft 49. These bristles are made of a plastic which is selected to be alkali and acid resistant. The diameters of the brushes 51 are made to be such that they do not interengage one with the other, FIG. 10, but are in close proximity one with the other.

The back plate 44 extends laterally, horizontally beyond the end brackets 43 as indicated in FIG. 10, to form guide edges. There is a lower bar 52 fixed across the lower sides of the bracket arms 46.

A brush unit holder is illustrated in FIGS. 7–9. This holder is designated generally by the numeral 53. A planar plate 54 carries vertically extending channels 55 and 56 at opposite ends. There is a ledge 57 carried across the lower end of the plate 54 between lower ends of the channels 55 and 56. The lower end of the plate 54 is rockably engaged with a rod 58 by means of members 59 and 60 surrounding the rod 58 and slidable axially of the rod. The rod 58 is fixed to a spacer bar 61 by means of brackets 62 herein shown as three in number. The central bracket 62 is intermediate the member 59 and 60. A plate 64 extends from the bar 61 which is at the rear side of the holder 53, to the forward side of the holder as indicated in FIGS. 8 and 9. The vertically disposed plate 54 has a bracket 65 extending upwardly therefrom and has a horizontally disposed slot 66 therethrough.

The brush unit is fitted to the holder 53 by inserting the vertical ends of the back plate 44 into the upper ends of the channels 55 and 56 and allowing the plate to drop to have a cross bar 67, extending between the lower arms 46, rest on the ledge 57. The plate 44 is then secured by means of latch fingers 68 springing over the top edge of the plate 44. A plate 69 extends across and between the upper arms 45. The fingers 68 are elastic members fixed to the back side of the holder plate 54 to extend by upper ends over the upper edge thereof as indicated in FIG. 8 particularly. There is a cam block 70 fixed to the holder 53, FIG. 7, at an elevation slightly above the rod 58 and adjacent the vertical edge 56a of the holder.

There are two of these brush unit-holder assemblies employed. They are identical in construction. These two assemblies are placed within the box 22, FIGS. 2 and 5, to have the lower plates of each, plate 64, rest on the floor 24 with the spacer bar 61 against the walls 26 and 27. The holder plate 54 in each instance has a spacer bar 71 extending along its back side and at an elevation which will permit it to fit under the ledges 25 on the walls 26 and 27 and against the side wall. The spacer bar 71 as well as the bar 61 thus space the plates 54 to be limited to a substantially vertical position parallel with the box walls in each instance. The brush holders 53 tend to rock under gravity influence one toward the other but when the brush units are mounted in the holder units 53, the holders 53 are restrained by the bar 52 which is fixed to the brush unit in each case to bear on the plate 64, in turn resting on the floor 24 so that rocking of the holder 53 is then restrained and the spacer bar 71 is maintained normally under the legs 25 to prevent vertical lifting. However, in order to remove the holders 53, the latches 68 are pressed back from over the plate 54; the brush unit lifted upwardly free of the holder; and then the holder 53 is rocked on the pin 58 to move the bar 71 from under the legs 25, and the holder is then lifted from the box 22. The brackets 65 extend above the top edge 73 of the box 22, outturned ends 77 and 78 of the rods 38 and 39 are inserted through the slots 66 of the brackets 65.

However before the ends 77 and 78 are so inserted, a cover designated by the numeral 80 is fitted down over the top of the box 22, the top edges 73–76 being rabbeted to receive a downturned flange 81 of the cover thereover and preferably with a gasket 82 between that flange and the rabbet, this rabbet being generally designated by the numeral 83. The cover 80 is divided with slots 74 and 75 therethrough to permit the brackets 65 to extend vertically above the cover. The cover 80 is also provided with a central slot therethrough from end to end. At each end of the slot 85 there is an upwardly extending splash shield preferably provided, these shields being designated by the numerals 86 and 87. The slot 85 is centrally disposed in relation to the box 22 between the sides 26 and 27.

Figure 3:
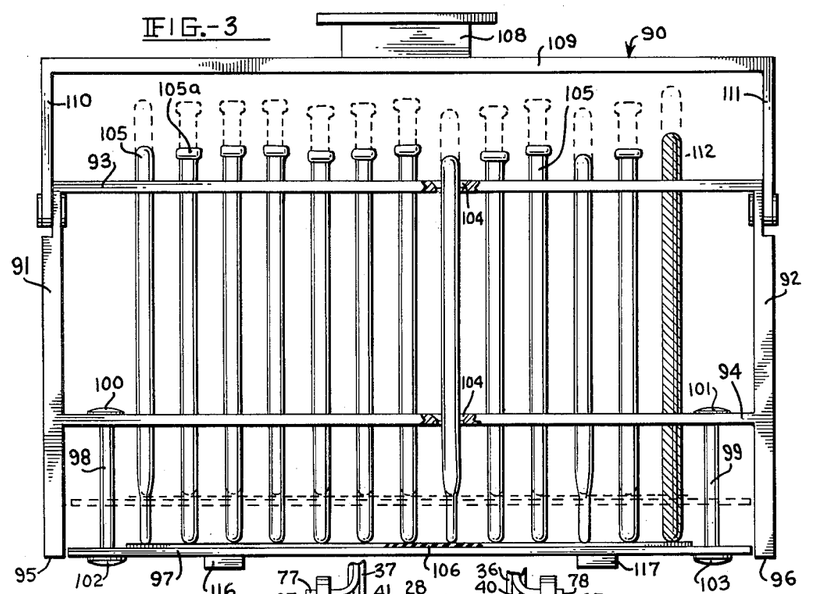
FIG. 3 is a view in side elevation and partial section of a thermometer carrier on an enlarged scale.
Figures 4, 5:
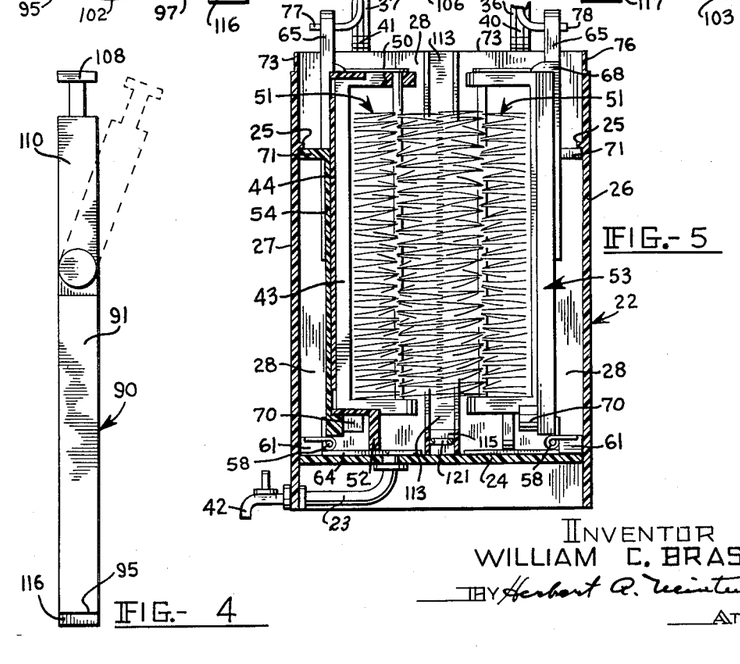
FIG. 4 is a view in end elevation of the carrier.
FIG. 5 is a transverse section on the line 5—5 in FIG. 2.

A thermometer holding frame generally designated by the numeral 90, FIGS. 3 and 4, embodies a rigid frame having side legs 91 and 92 with a top interconnecting bar 93 and a lower bar 94 interconnecting the legs 91 and 92 at a distance above their lower ends 95 and 96. A floating bar 97 is suspended below the bar 94 on two pins 98 and 99 hanging downwardly from the bar 94. These pins 98 and 99 have heads 100 and 101 which rest on the top side of the bar 94, and have lower heads 102 and 103 respectively against which the floating bar 97 normally rests. The pins 98 and 99 may be made free to lift upwardly through the bar 94, and the floating bar 97 is free to travel upwardly along those pins. Normally the pins 98 and 99 will remain in positions hanging from the bar 94 with their heads 100 and 101 resting thereon.

Both the upper bar 93 and the intermediate bar 94 are provided with a plurality of vertically aligned holes 104 through which thermometers 105 may be inserted to have their lower ends resting on the floating bar 97. The lower ends of these thermometers are cushioned by a resilient tape 106 fixed to the top side of the floating bar 97. Of course this so-called tape 106 does not have to be in the nature of a tape, the essential quality being that there be some resilient material to cushion the mercury reservoir ends of the thermometers 105 so that they do not come into direct contact with a metallic or other rigid surface. The tape 106 may be made out of any suitable resilient plastic such as a synthetic rubber or the like or may even be made out of rubber. It is essential that the material be resistant to alkalis and acids.

The spacing apart of the bars 93 and 94 is made to be such that the thermometers 105 will be held upright as indicated in FIG. 3 even when the lower floating bar 97 may be lifted such as to the level of the dash lines. These clinical thermometers come in various lengths and conformations such as the head ends and the reservoir ends as indicated by the varying shapes as shown in FIG. 3. Many of these thermometers are provided with a head 105a for easy grasping of the thermometer when it is shaken to return the mercury in the column to a lower level or to the reservoir. There is a handle 108 fixed to a transverse bar 109 which in turn has downturned legs 110 and 111 pivotally connected to the upper ends of the holder legs 91 and 92 so that the bar 109 may be rocked to one side as indicated by the dash lines in FIG. 4. This is provided to permit the removal and replacing of the thermometers 105 in the holder by rocking the bar 109 to one side.

The holder 90 when loaded with thermometers herein shown as twelve in number is preferably provided with an extra space to receive a rod 112 of an identifying color, herein shown as red. This rod 112 when inserted in the holder along with the thermometers 105, is an indicator that all of the thermometers in that specific holder require cleaning and are not to be used until they are sterilized.

Figure 1:
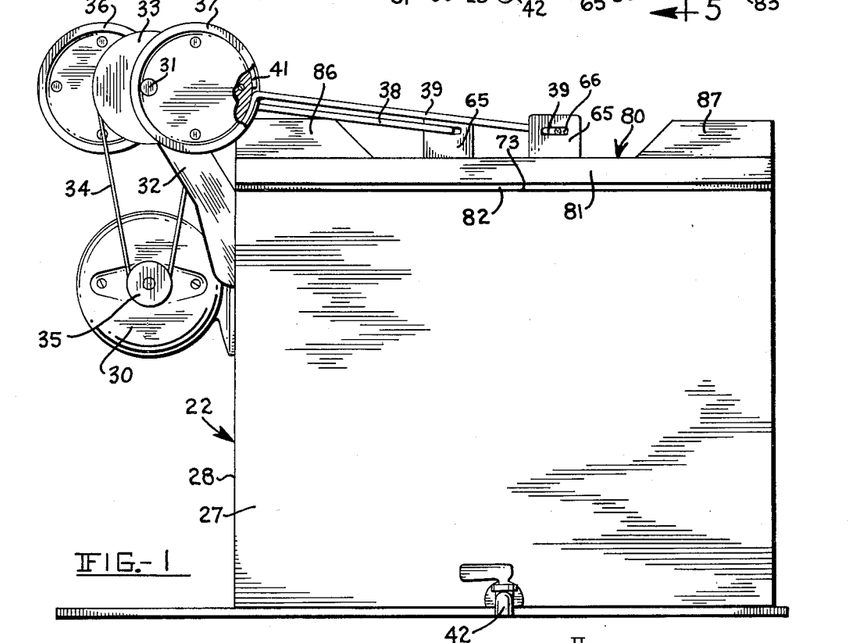
FIG. 1 is a view in side elevation of the initial cleaning structure.
Figure 2:
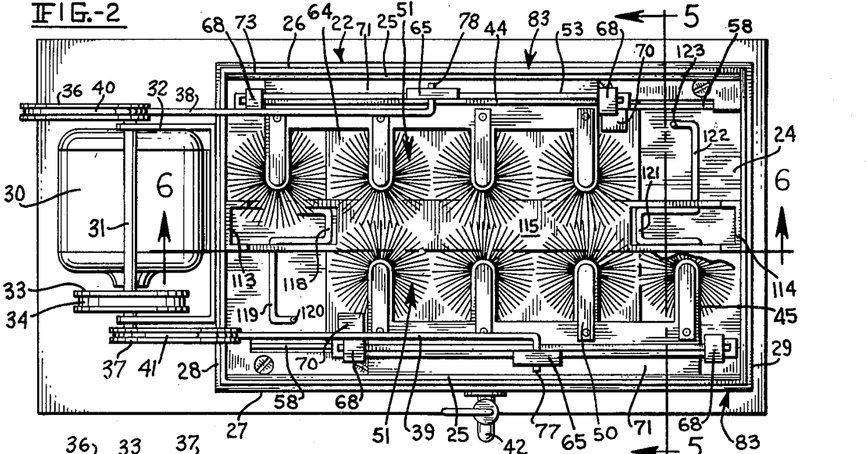
FIG. 2 is a view in top plan of the structure with the top cover removed.
Figure 6:
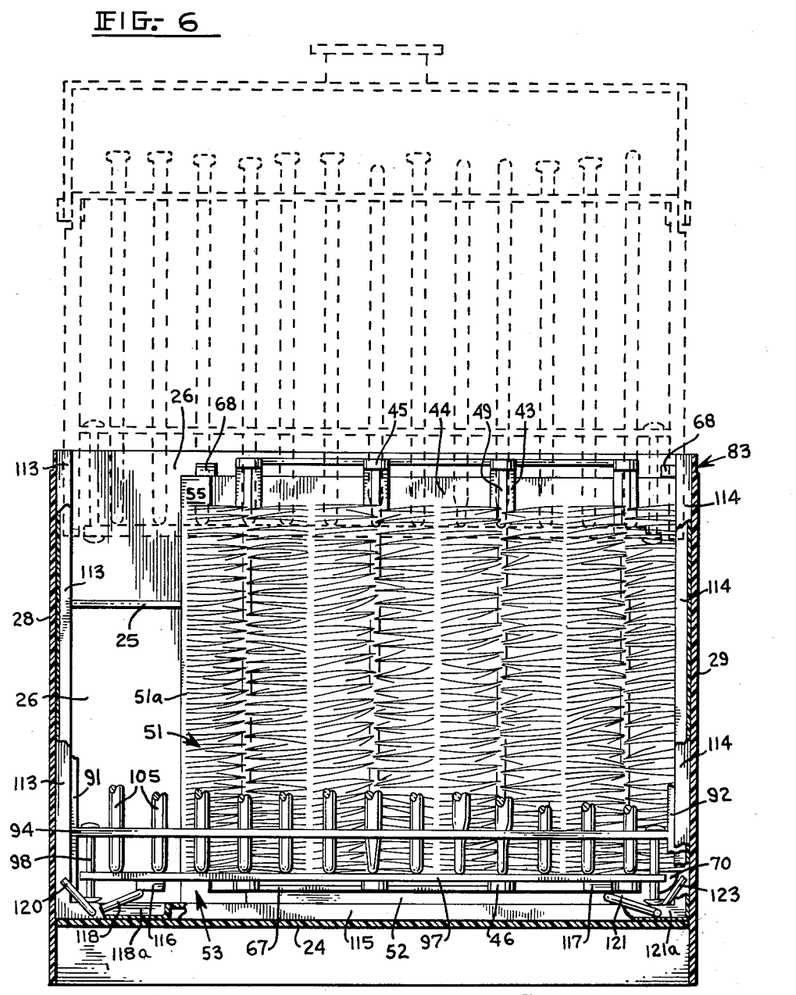
FIG. 6 is a view on an enlarged scale in vertical section on the line 6—6 in FIG. 2.

When the holder 90 is thus loaded with thermometers to be cleaned, it is brought to the box 22 and the lower end portion is lowered between the two brush units as indicated in FIG. 6. The brush units are so designated proportioned that the bristles of one unit will just come into contact with the bristles of the other unit as indicated in FIG. 2. This is desirable inasmuch as the holder 20 is to be carried downwardly between the two units so that the bristles of the brushes in opposition one unit with the other will be in rubbing contact with the thermometers 105. However the positioning of the bristles of one unit in relation to the bristles of the other will support the holder in the dash line position as indicated in FIG. 6 so that as the two units are reciprocated by the motor 30 through the reciprocating rods 38 and 39, the travel being in alternate directions one unit with the other, the holder 90 will gradually work downwardly under the influence of gravity between the two sets of brushes. In this downward travel of the thermometer holder 90, the two legs 91 and 92 enter within vertical flanges 113 and 114 forming channels being centered on the inside of the ends 28 and 29 to extend vertically thereof.

There is a ridge 115 herein shown as being in the nature of an inverted channel interconnecting the lower ends of the channels 113 and 114, and this ridge 115 rests on the floor 24. The underside of the floating bar 97 is provided with two spacing blocks 116 and 117 which will come within end portions of the ridge 115 when the floating bar 97 is in its lowermost possible position. This would be the position of a floating bar 97 when the motor 30 is not energized and the brush units are not being reciprocated within the box 22.

However, the floating bar 97 is lifted with each reciprocation of the brush units. Referring to FIGS. 2 and 6, there is a U-shaped crank 118 rockably supported at one end (left end FIG. 2) in one of the end openings 118a in the ridge 115 and a shaft 119 extends from this crank 118 toward the side 27 of the box 22, terminating with an upturned arm 120 in the path of the cam 70. When the rod 39 pulls the brush unit 51 to the left, FIG. 2, this cam 70 strikes the arm 120, and through the shaft 119, rocks the crank arm 118 upwardly and against the underside of the spacing bar 116 of the floating bar 97 lifting that bar upwardly, and thus lifting the thermometers 105 as indicated in FIG. 6. Likewise there is a crank 121 at the other end opening 121a of the ridge 115 likewise rockably supported in an open end thereof, and a shaft 122 extends therefrom to an arm 123 so that the cam 70 of the other brush unit 51 strikes that arm 123 and causes the crank 121 to rock upwardly and lift the other spacing bar 117 of the floating bar 97 so that the bar is simultaneously lifted at both ends to keep the bar 97 approximately horizontally disposed.

In this lifting action, the thermometers 105 are only lifted after they have vertically traversed the brushes 51a from top to bottom, and this extra reverse movement of the thermometers 105 by the bar 97 reciprocates the thermometers vertically of those brushes a number of times depending how long the brush units 51 are allowed to reciprocate. Also since the lifting action of the floating bar 97 is in a more or less jerking action, the thermometers 105 are tended to be lifted from their contact with the strip 106 thereby exposing the under ends of those thermometers whereby the bristles will have thorough access thereto. It is of course undersood as above indicated that the box 22 will be containing a cleaning fluid to a level approximately at the top of the brushes 51. The cover 80 will confine the fluid therein, and the splash shields 86 and 87 will prevent fluid from being splashed outwardly under the reciprocation of the brackets 65 from end to end of the cover slots and particularly when the thermometer frame vertically disposed legs reach the ends of the slot 85.

The speed of reciprocation of the brush units 51 may be varied of course, one such speed now operating very satisfactorily being at about thirty reciprocations per half minute. The duration of the reciprocations will again depend upon the nature of the cleaning fluid and the speed of reciprocations. Of course the cleaning devices may be built in multiple units so that there are a multiple number of boxes 22 and structurally equipped as above described. In any event when the thermometers are deemed to be thoroughly cleaned, the motor 30 is stopped, and by grasping the handle 108, the thermometer holder may be pulled vertically upwardly to permit its removal from the box 22. Of course the fluid within the box 22 may be changed with each cleansing travel of the holder down into the box, by draining it through the petcock 42.

Figure 13:
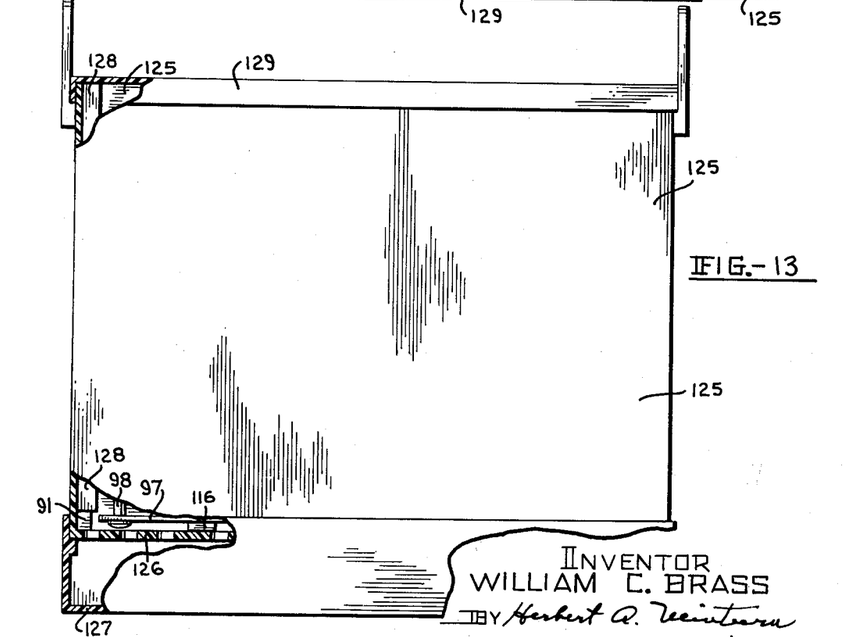
FIG. 13 is a view in side elevation and partial section of the receptacle.

After having been cleaned in the apparatus so far described, the thermometer holder may be placed in a box 125, FIG. 13, which box has a floor 126 therein above a detachable tray 127. This floor 126 is perforate, and provides a means for supporting the legs 95 and 96 of the holder thereon. The box 125 is provided with a plurality of vertically disposed ribs 128 spaced one from the other on each end of the box so as to receive slidingly therebetween in each spacing, a holder 90. The holders with the thermometers may be allowed to drain in this box 125, and then further cleansed by some sterilizing solution in which the holders may be allowed to stand for a predetermined interval of time. There is a cover 129 provided to cover the box 125 with its holders 90 therein. If further treatment of the thermometers is desired, the box 125 containing the holders may be transferred to successive baths, the thermometers in their holders remaining in the box 125 at all times.

Figure 14:
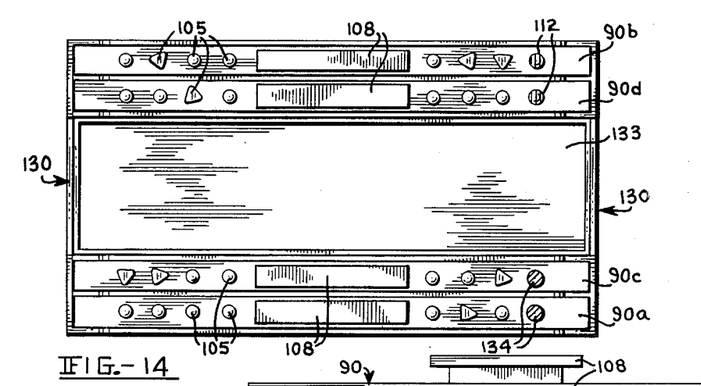
FIG. 14 is a view in top plan of a thermometer carrier.
Figure 15:
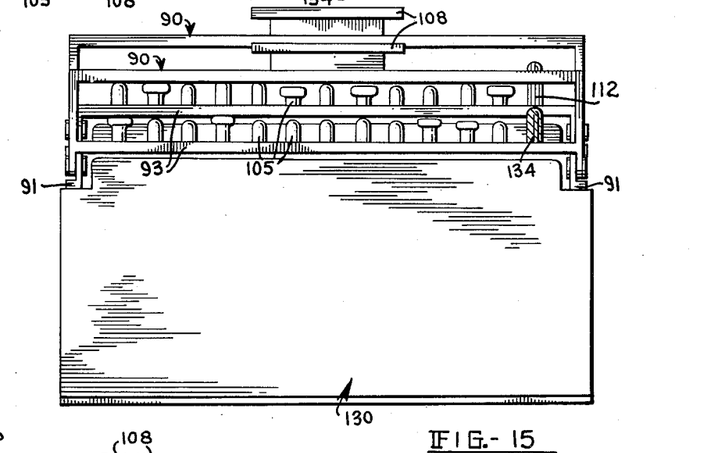
FIG. 15 is a view in front elevation of a carrier.
Figure 16:
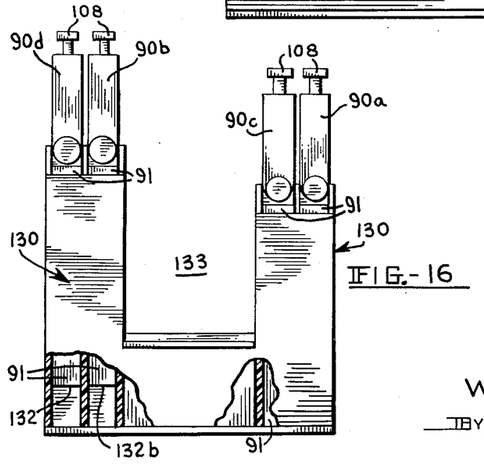
FIG. 16 is a view in end elevation and partial section of the carrier.

When it is desired to call on a number of patients for the usual temperature taking, the aid or nurse is provided with a carrier 130, FIG. 14, which has a plurality of spaces on one side, preferably the front side, two such spaces being shown herein to receive two holders 90. Spaces are provided at the rear of the carrier, to receive two holders 90. However the rear spaces are not initially filled, so that when the aid goes to the patient, a thermometer will be taken out of the first holder frame 90a which carries clean thermometers designated as such by an end green colored pin 134, and then after the temperature is taken, it will be placed in an empty holder placed in the holder frame 90b, this holder having a telltale red pin 112 to indicate that thermometers placed in the holder 90b have been used. The holder 90b will rest upon a stop 132 so that it will be at a higher elevation than that of the front holder 90a. The same procedure holds with the next holder 90c from which thermometers will eventually be returned to the holder 90d. Spaces provided between the two sets of holders, the space being designated by the numeral 133 wherein the aid may place records or notes as to the particular patients visited and as to the temperatures indicated by the thermometers.

Figure 17:
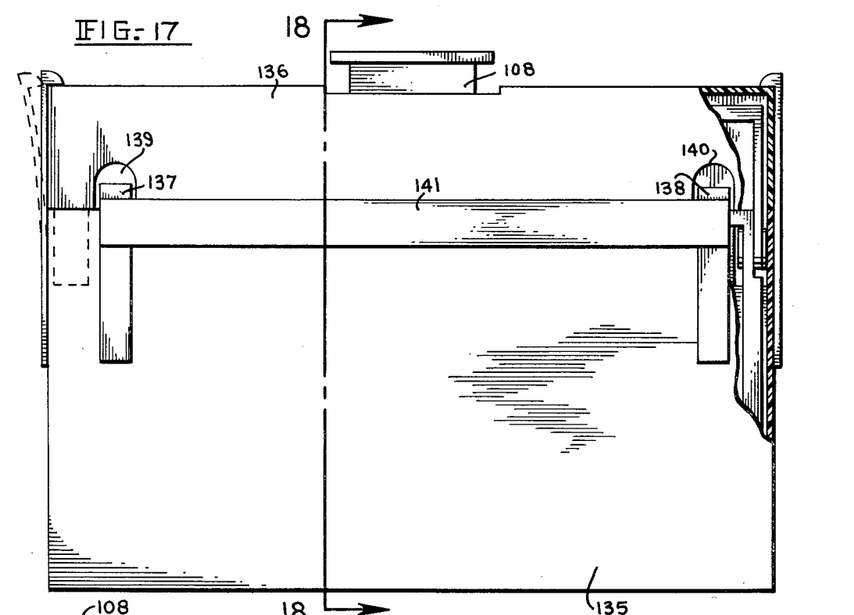
FIG. 17 is a view on an enlarged scale and partial section of an individual thermometer frame holder and carrier.
Figure 18:
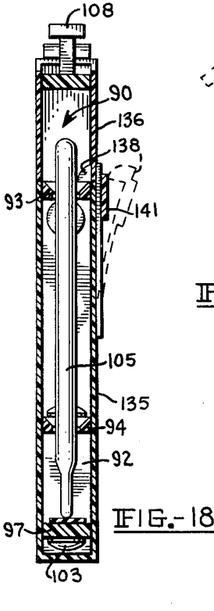
FIG. 18 is a vertical transverse section on the line 18—18 in FIG. 17 indicating means for retaining the thermometer frame therein.
Figure 19:
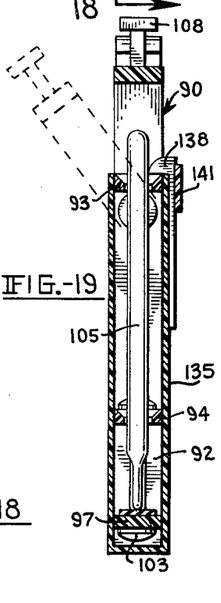
FIG. 19 is also a vertical section on the line 18—18 in FIG. 17 indicating how thermometers may be removed from the carrier.
Figure 20:
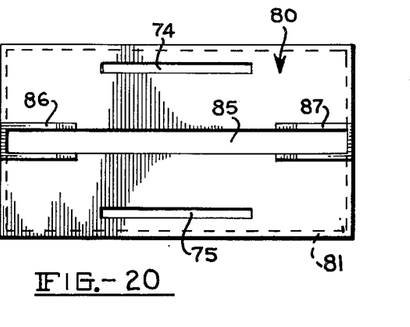
FIG. 20 is a view in top plan on a greatly reduced scale of the cover for the members shown in FIGS. 1 and 2.

The holders also lend themselves to be carried one at a time in a single holder case as indicated in FIGS. 17–19, such as will be the case in a doctor's office or in a doctor's bag as he calls on out patients. This carrier designated by the number 135 is just sufficiently wide interiorly to recevie a single holder 90 and has a removable cover 136 through which a handle 108 may extend. After the thermometer holder 90 is inserted into the carrier 135 with the cover 136 removed, this cover may be returned in position as indicated in FIGS. 17 and 18. The holder is held in a fixed position within the carrier 135 by means of finger latches 137 and 138 entering through cutouts 139 and 140 through the cover 136 to engage over the top bar 93 of the holder. The fingers may be released by pulling outwardly on the interconnecting strap 141. The holder 90 does not need to be removed from engagement therein as maintained by the fingers 137 and 138 until a cleaning operation is required. The cover 136 is removed, whereupon the handle 108 is rocked to one side as indicated by the dash lines, FIG. 19, to permit access to the upper ends of the thermometers 105 for their removal.

It is therefore to be seen that I have provided a rapid method of cleaning and dispensing cleaned and sterilized thermometers by use of the inventive device where a multiple number of thermometers may be cleaned in one operation. Furthermore it is to be seen that the construction of the device is relatively simple and may be made at a relatively low cost of production. Moreover the device can be operated by any previously untrained helper in the hospital without requiring the labor of a higher priced registered nurse or aid.

Therefore I do not desire to be limited to the precise form of the structure described since it is obvious that many structure variations may be employed therein including variations in the material chosen, all without departing from the spirit of the invention, such limitations as may exist being only those as may be required by the following claims.

I claim:

1. A thermometer cleaning device comprising a fluid receptacle having approximately parallel opposing sides; a bank of vertically disposed brushes on each of opposing interior sides of said receptacle,
means horizontally reciprocally carrying each of said banks of brushes;
drive means oppositely reciprocating said brush bank carrying means to horizontally shift said brush banks one past the other; a
thermometer holder comprising means loosely holding thermometers in vertical and rotative positions; and exposing the thermometers from opposite sides of the holder; and
guide means receiving opposite end portions of said holder to present the holder vertically and approximately centrally between said brush banks;
said brush banks being disposed to have their brush outermost parts brush over the lengths of said thermometers as said holder passes downwardly therebetween.

2. The structure of claim 1, in which
said brushes each comprises a central shaft from which radiate bristles therearound; and
each of said banks rotatively retains a plurality of brushes in juxtaposition permitting each brush to be rotated individually of an adjacent brush.

3. The structure of claim 1, in which there is a
rockable member extending across the top of said thermometer holder spaced above said thermometers and requiring to be rocked to one side to permit insertion and removal of the thermometers.

4. The structure of claim 1, in which there is a
vertically shiftable bar across the under side of said holder upon which bar said thermometers rest by their lower ends; and there is
means raising said bar at least once in each full reciprocation of said brush banks.

5. The structure of claim 4, in which said bar raising means comprises
crank means under the shiftable bar, and a member moved by said brush bank travel operating the crank means;
said bar raising and lowering the thermometers for brush contact of zones otherwise covered by said pair of bars.

6. The structure of claim 1, in which each of said brush banks has a
bracket member extending upwardly; and said drive means comprises eccentrics in said drive means; and connecting rods reciprocated by the eccentrics and detachably engaging said bracket means over said receptacle.

7. For clinical thermometer cleaning means, a thermometer holder comprising a
frame having a pair of vertically disposed end legs;
a pair of spaced apart, horizontally disposed bars having their ends fixed to said legs, and having aligned holes therethrough to receive loosely and maintain thermometers in approximately vertical positions;
a third bar horizontally extending freely between said legs, below the lower one of said pair of bars;
means suspending the third bar for vertical travel under said one bar and limiting its down travel to a predetermined position;
said thermometers resting by lower ends on said third bar; and a
U-shaped member rockably engaging each of said legs and extending normally in spaced relation above and across the upper bar of said pair;
the spacing of the U-shaped member being that which, in its normal position, will prevent insertion and withdrawal of thermometers from the holes of said pair of bars.

8. In a clinical thermometer cleaning device, a brush bank unit comprising
a plurality of brushes each having a vertically disposed shaft to which bristles are fixed and radiate by approximately common lengths forming in effect a cylindrical brush;
a back member;
means rotatably mounting said brushes on said member and maintaining said shafts in substantially a common plane;
a holder detachably holding said back member;
a plate rockably carried at a lower edge portion of said holder and extending under said brushes; and
a bar member stop between said plate and said holder limiting rocking of said holder carried brushes over said plate.

9. The structure of claim 8, in which there is a
receptacle having a floor; upturned opposing side and end walls;
said brush unit resting by its plate member on said floor adjacent each of said side walls;
means spacing apart said base members;
an abutment carried by said holder directed toward a wall of the receptacle; and an
abutment on the receptacle wall over said holder abutment retaining the plate against vertical travel.

10. The structure of claim 9, in which there is a
vertically disposed slot along each vertical end of said holder;
said back member has vertical end portions slidingly engaging in said slots; and
latch means retaining the back member against vertical travel from said holder.

11. A device for cleaning clinical thermometers comprising a
receptacle having opposing sides;
a plurality of brushes along each of opposing inner sides of the receptacle;
a holder for each group of brushes supporting the brushes in free rotative travel; said brushes being at least as long as the thermometers, and being approximately vertically disposed; a
thermometer holder frame supporting a plurality of the thermometers in both rotative and axial travel;

means receiving and guiding the holder downwardly between said groups of brushes;

means horizontally reciprocating said brush groups, one group reciprocating oppositely of the other group;

said brushes being positioned one group on one side of said thermometer holder frame and the other brush group on the opposite side of said frame to be rotated by engagement of said thermometers therebetween as the brush groups are reciprocated therepast;

means shifting said thermometers in said holder vertically to present the entire thermometer length to said brushes in at least one complete reciprocation of the brushes; and means retaining the brushes against a predetermined vertical travel.

12. The structure of claim 11, in which said thermometer vertical shifting means comprises a bar vertically shiftably carried by said frame and on which the thermometers rest;

a member located under each end portion of said bar;

a cam at opposite ends of said brush holders;

said members being in the path of said cams and lifting the member at opposite ends of reciprocation of the brush holders thereby elevating said bar and the thermometers in the frame.

References Cited in the file of this patent

UNITED STATES PATENTS

| | | |
|---|---|---|
| 2,145,879 | Jewett | Feb. 7, 1939 |
| 2,902,170 | Miller | Sept. 1, 1959 |
| 3,036,320 | Behrendt | May 29, 1962 |
| 3,066,336 | Stobbe | Dec. 4, 1962 |